R. S. DARLING.
BRACKET FOR GLASS PERCOLATORS.
APPLICATION FILED JULY 15, 1915.
1,169,013.
Patented Jan. 18, 1916.
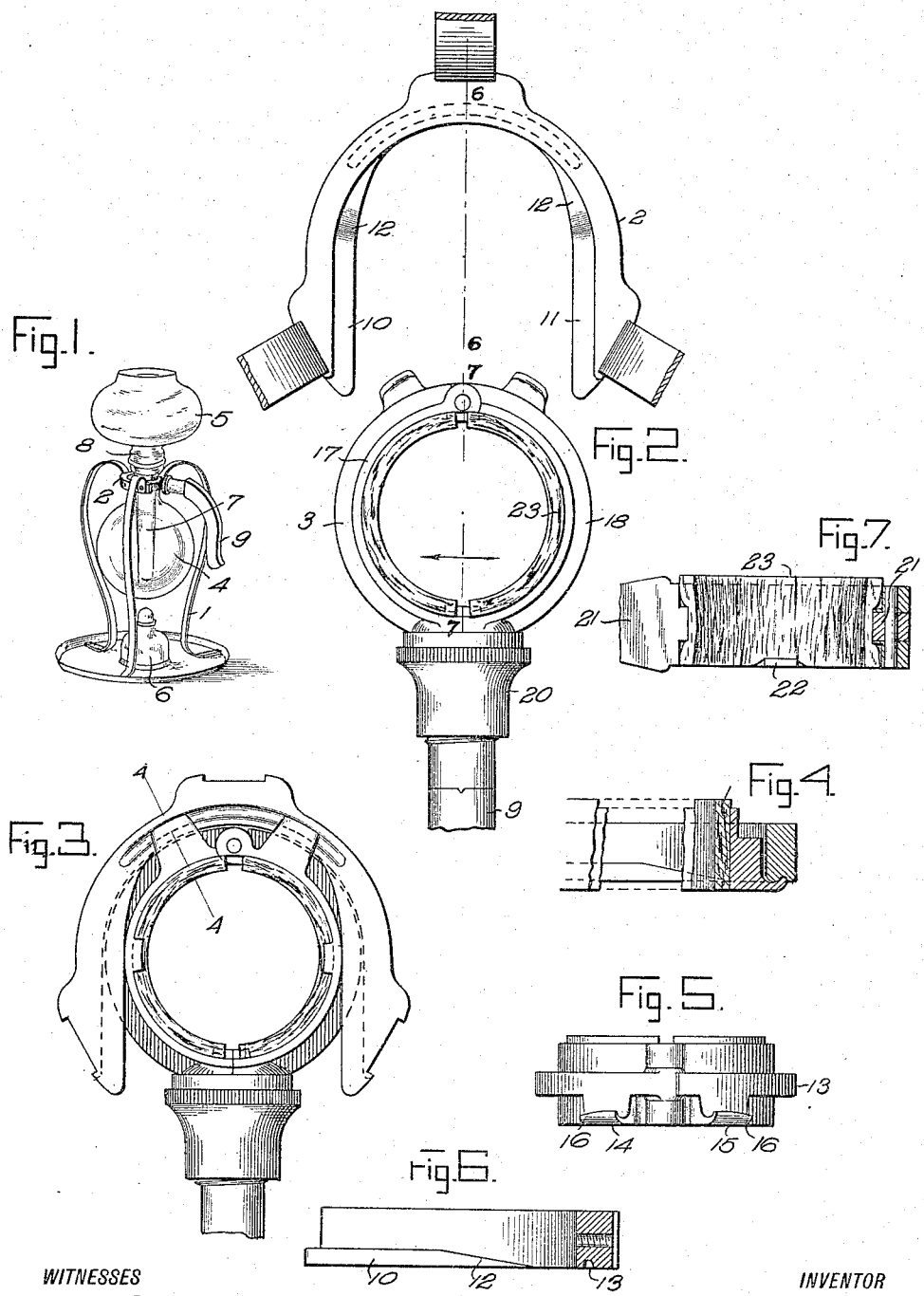
WITNESSES
E. K. Reichenbach.
A. L. Kitchin
INVENTOR
Richard S. Darling
BY Munn & Co.
ATTORNEYS

UNITED STATES PATENT OFFICE.

RICHARD S. DARLING, OF NEW YORK, N. Y., ASSIGNOR TO PARAMOUNT GLASS PERCOLATOR MFG. CO., OF NEW YORK, N. Y., A CORPORATION OF DELAWARE.

BRACKET FOR GLASS PERCOLATORS.

1,169,013.  Specification of Letters Patent.  Patented Jan. 18, 1916.

Application filed July 15, 1915. Serial No. 40,137.

*To all whom it may concern:*

Be it known that I, RICHARD S. DARLING, a citizen of the United States, and a resident of the city of New York, borough of Manhattan, in the county and State of New York, have invented a new and Improved Bracket for Glass Percolators, of which the following is a full, clear, and exact description.

This invention relates to percolators and particularly to percolators of the glass type, and has for an object the provision of an improved arrangement of bracket for holding the parts together and for allowing a proper manipulation of certain of the parts.

Another object in view is to provide an improved bracket whereby the parts may be assembled and disassembled by a direct horizontal movement.

A still further object in view is to provide a bracket for a percolator of this character which may be interlocked in such a manner as not to be capable of accidental disengagement.

In the accompanying drawings: Figure 1 is a detail perspective view showing an embodiment of the invention applied; Fig. 2 is a top plan view of the brackets in position ready for engagement; Fig. 3 is a bottom plan view of the bracket and ring shown in Fig. 2 the same being shown assembled; Fig. 4 is a detail sectional view through Fig. 3 on line 4—4; Fig. 5 is a front view of the supporting ring shown in Figs. 2 and 3; Fig. 6 is a detail sectional view through Fig. 2 approximately on line 6—6; Fig. 7 is a sectional view through Fig. 2 approximately on line 7—7.

Referring to the accompanying drawings by numerals, 1 indicates a stand of any suitable kind, provided with a bracket 2 which is adapted to receive a ring 3. The ring 3 is designed to surround the upper end of a globe or bowl 4 into which the lower end of a second globe or bowl 5 is positioned. In using the device water is placed in the bowl 4 and when the lamp 6 is lighted said water will be heated and forced upwardly through the hollow stem 7 into the bowl 5 where it comes in contact with the coffee placed therein. As long as the lamp is maintained under the bowl 4 the water is forced upwardly until substantially all of the water is positioned in bowl 5, whereupon the lamp 6 is removed and the water which has now absorbed the flavoring qualities of the coffee will pass downwardly through the stem 7 into bowl 4.

A suitable straining device is arranged at point 8 so as to prevent the grounds from entering the bowl 4. After the contents in the bowl 5 has drained into the bowl 4, the bowl 5 is removed and also the bowl 4 may be removed whenever desired by using the handle 9. The handle 9 is connected with ring 3 surrounding the neck of the bowl 4 and is arranged to engage the bracket 2 in such a manner as to be moved in a substantially straight line when being moved into position in bracket 2 or when being moved therefrom.

In forming the bracket 2 runways 10 and 11 are provided, each of which is constructed with a downwardly slanting portion 12, as clearly shown in Figs. 2 and 6. At the closed end of the bracket 2 and on the lower surface thereof there is provided a groove 13 adapted to receive the hook members 14 and 15. It will be observed that each of the hook members is provided with a slanting upper edge 16, the lower end of which engages the lower surface of bracket 2 as the ring is being forced into position. After the lower part of the edge 16 engages bracket 2 the continued forward movement of the ring 3 will cause this edge to slightly depress the hooks 14 and 15 until they are allowed to pass into the groove 13, whereupon they will be locked against accidental disengagement. By providing an almost direct horizontal movement of ring 3 the bowl 4 need not be tilted when applying and removing.

In constructing the ring 3 the same is made into parts 17 and 18 hinged together by a suitable pin 19. The end opposite the pin 19 is connected with the handle 9 in any suitable manner, as for instance, by having the threaded sleeve 20 threaded thereover. Each of the parts of the ring 3 is provided with a lug 21 at each end and a lug 22 preferably centrally thereof and adjacent the bottom edge. These lugs are provided so that when the cork packing 23 is forced into position as shown in Fig. 7, the same will be forced around these lugs and will become interlocked therewith so that when the cork becomes worn the same will not move out of place.

What I claim is:

1. In a percolator of the character described, a fixed bracket provided with a pair of runways having beveled end portions, said bracket being formed with a groove adjacent one end, and a globe supporting ring formed with interlocking hook members, said ring being adapted to slide along said runways and be guided by said inclined portions so that the hook members will project into said groove.

2. In a percolator of the character described, a fixed bracket provided with runways and a groove, a supporting ring adapted to rest on said runways and be guided thereby in back and forth movement when applying and removing, and a pair of hook members extending from said ring, said hook members having their upper edges inclined so that the lower part thereof will fit beneath the fixed bracket in order to slightly depress the hooks when applying the ring, whereby the hooks will pass under said part of said bracket and then into said groove for preventing accidental disengagement of the ring.

3. In a device of the character described, a supporting bracket, a removable ring structure carried by said bracket, said ring structure being formed in parts and hinged together, each of said parts being provided with a plurality of lugs intermediate their height and a lug adjacent the bottom, and a packing member of cork pressed into position on each of said parts, said packing being caused to partially surround said lugs whereby the packing is prevented from accidental removal.

4. In a device of the character described, a supporting bracket for a percolator provided with a grooved portion near one end and a pair of supporting runways, a ring for supporting a globe, said ring normally resting on said runways, hook members extending from said ring and fitting into said groove for preventing accidental removal of the ring, cushioning members arranged in said ring, and means extending from said ring and interlocking the cushioning members for preventing accidental removal of the cushioning members.

In testimony whereof I have signed my name to this specification in the presence of two subscribing witnesses.

RICHARD S. DARLING.

Witnesses:
A. L. KITCHIN,
PHILIP D. ROLLHAUS.

Copies of this patent may be obtained for five cents each, by addressing the "Commissioner of Patents, Washington, D. C."